INVENTOR.
EUGENE C. MICHAELS
BY
PARKER & CARTER
ATTORNEYS

United States Patent Office 2,924,233
Patented Feb. 9, 1960

2,924,233

PACKING ASSEMBLY FOR VALVES

Eugene C. Michaels, Chicago, Ill.

Application September 20, 1954, Serial No. 457,210

11 Claims. (Cl. 137—315)

The present invention is directed to a new and improved form of diaphragm packed valve. It is specifically directed to that form of diaphragm packed valve, in which the valve closure element seals off one passage while leaving the other passage exposed to the diaphragm.

In this valve a diaphragm which is made of rubber or other suitable flexible material, is interconnected with the valve operating stem and serves to seal off the valve operating elements from the pressure in the valve. In the normal use of this type of valve the diaphragm is flexed during movement of the stem. The diaphragm is subjected to deteriorated effects both from this movement and from the pressure within the valve. It becomes worn with use and requires replacement. In prior valves of this type, replacement of the diaphragm required taking the valve out of service. A major object of the present invention is the provision of a new and improved diaphragm packed valve assembly wherein the valve need not be taken out of service when it is necessary to change the diaphragm.

Another object of this invention is the provision of a new and improved means for sealing off the diaphragm from the pressure within the valve when the valve is either in the fully opened or fully closed position.

Another object of the present invention is the provision of a new and improved valve wherein improved actuating means are provided for forcing a valve closure element into its fully opened or fully closed position.

Another object of the present invention is to provide a new and improved mechanism for insuring a firm and fluid-tight seal between the diaphragm and the valve when the valve is either in its fully opened or fully closed position.

Other objects will appear from time to time in the course of the ensuing specification and claims.

Referring generally now to the drawings.

Like elements are designated by like characters throughout the specification and drawings.

Figure 1:
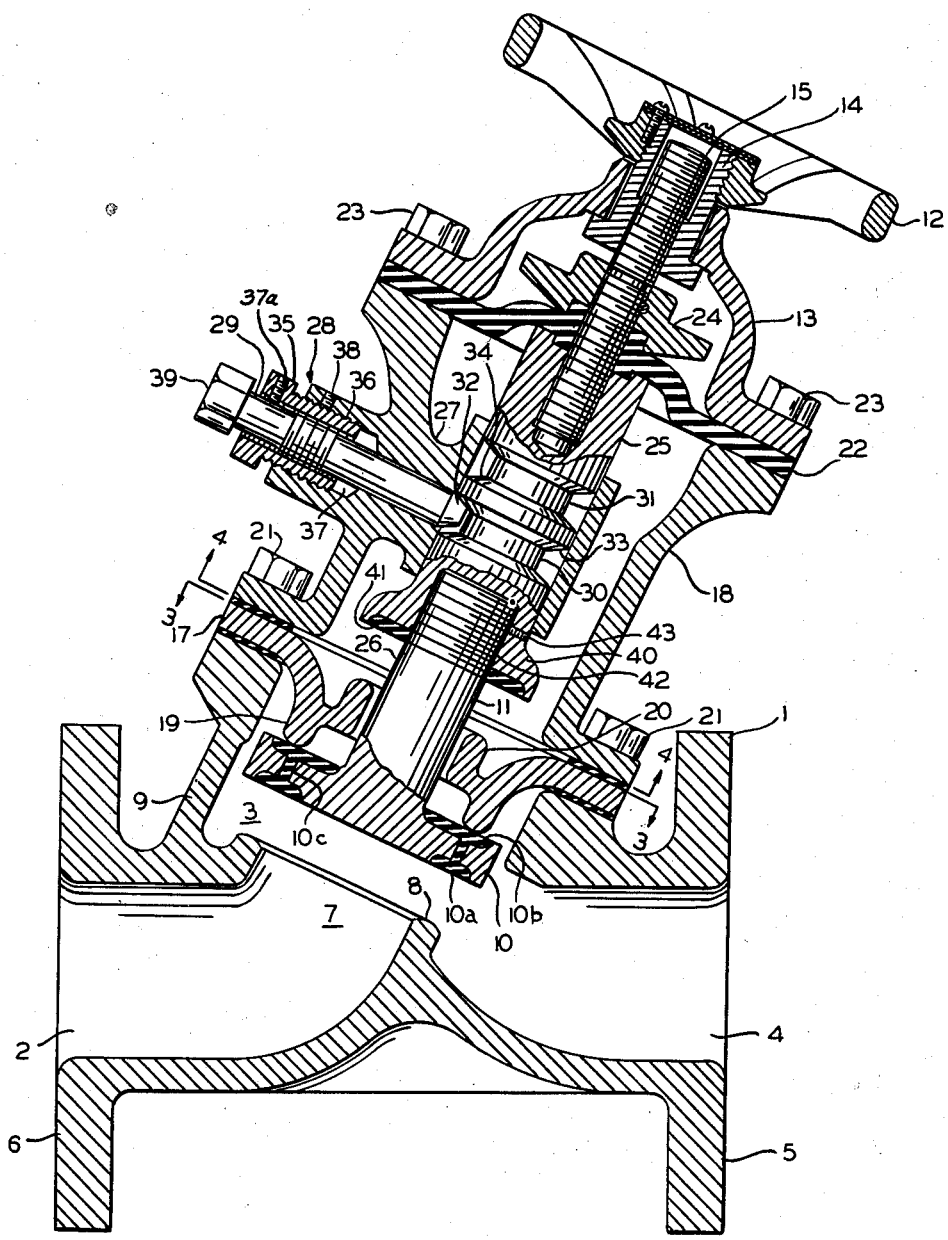
Figure 1 is an assembly view in section showing the improved valve of the present invention.

With specific reference to Figure 1, I illustrate a valve body 1 having a first passage 2 communicating through a chamber 3 with a second passage 4. Valve body 1 may have the customary attaching flanges 5 and 6. In this form of valve the passage 2 terminates in a portion 7 which is inclined to the main axis of the passages 2 and 4. A main valve seat 8 is defined by a circumferentially extending lip portion formed in the body of the valve between passage 2 and the chamber 3. Chamber 3 is defined by a hollow upstanding body portion 9 which has its axis extending perpendicular to the main valve seat 8.

In this form of valve a valve closure element indicated generally at 10 is carried by a stem 11. The valve closure element 10 is preferably in the form of a disc formed on the lower portion of the stem 11. It includes packing material 10a, which is formed in a circular recess in the face of the disc exposed to the valve seat 8. It also includes packing material 10b on the opposite face of the disc. The packing material 10b may also be formed in a recess in the disc. The packing material 10a and 10b which may be formed of rubber or the like is preferably joined by means of packing material extending through apertures between the recesses, as at 10c. When the valve closure element is forced downwardly against the valve seat 8 the packing material 10a is compressed to form a tight seal and prevent communication between passages 2 and 4.

Figure 2:
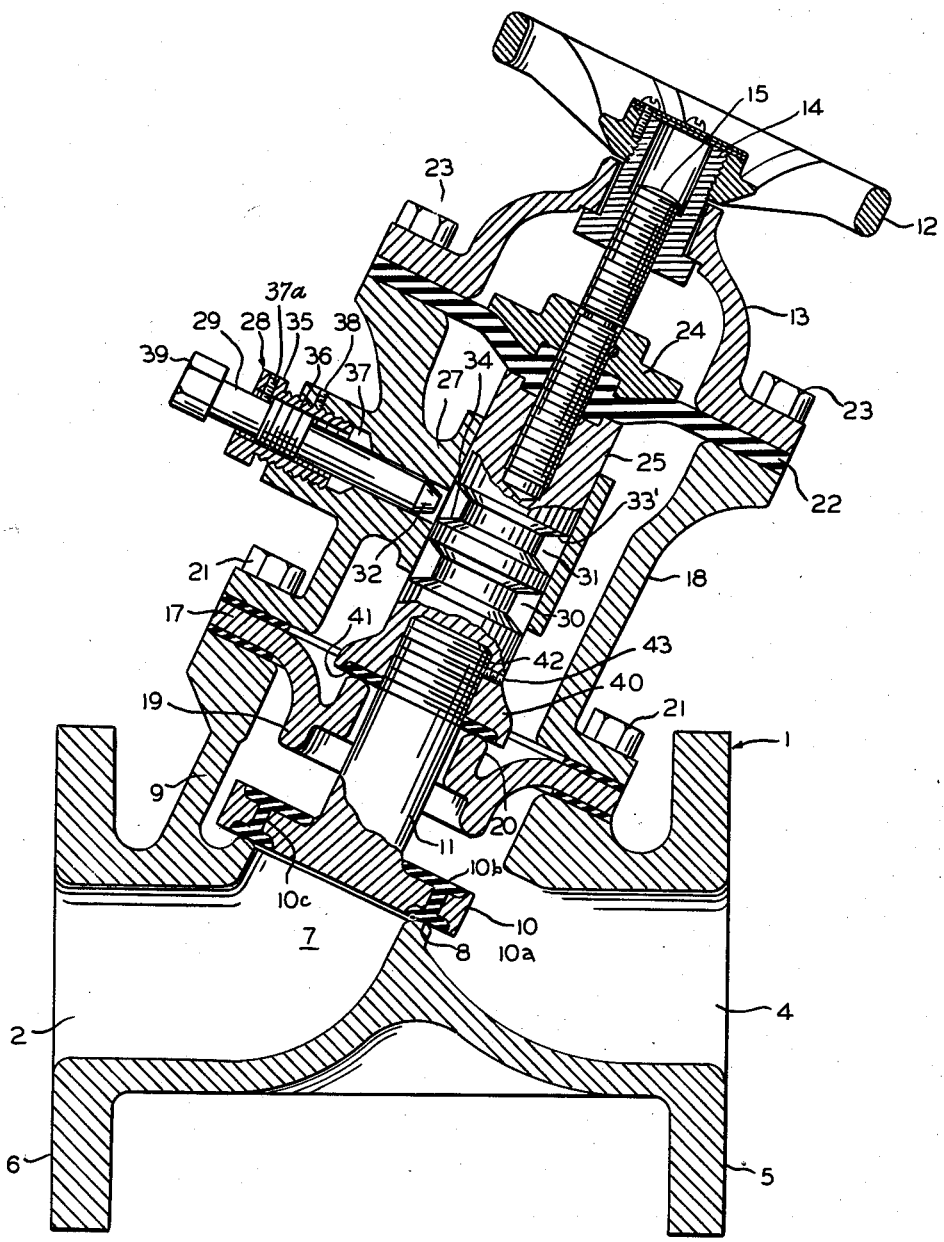
Figure 2 is a view similar to Figure 1 but showing another operative position of the valve element shown in Figure 1.

Movement of the stem 11 from the position shown in Figure 1 to the position shown in Figure 2 forces the valve closure element into firm sealing engagement with the main valve seat 8 and thereby closes off communication between the passages 2 and 4. A hand wheel 12 is threadably mounted in a bonnet 13 as by means of any suitable bushing 14. The hand wheel and bushing 14 threadably engage an upper portion 15 of the stem to thereby move the valve closure element 10 toward and away from the main valve seat 8. In conventional practice a diaphragm usually surrounds the stem and serves as a seal between the bonnet 13 and that portion of the body of the valve surrounding the stem.

According to my invention, I position a plate-like element or barrier member 17 between the upstanding portion 9 and an auxiliary, removable housing 18 which surrounds the valve stem. The plate or barrier or auxiliary seating member 17 has a pair of oppositely facing auxiliary valve seats thereon. One auxiliary valve seat may be formed by a lip 19 surrounding the stem 11 and facing towards the main valve seat 8. The other auxiliary valve seat may be defined by a second lip 20 surrounding the stem 11 and facing toward the operating means for the valve stem. Housing 18 and the plate 17 may be secured to the upstanding portion 9 in fluid-tight relation by means of any suitable capscrews or bolts 21.

A diaphragm packing which is formed of any suitable flexible material such as rubber or a rubber substitute, is indicated generally at 22. The diaphragm packing 22 is seated between the bonnet 13 and the upper portion of the housing or sleeve 18. The bonnet, diaphragm packing and sleeve may be secured in fluid-tight relation by capscrews or the like 23. The threaded portion of the valve operated stem passes through the central portion of the diaphragm and the central portion of the diaphragm is held tightly against the stem by means of a nut 24.

The operated stem for the valve includes an intermediate portion 25 which is threadably received by the upper threaded portion 15 of the stem and a lower portion 26 of the stem. The nut 24 forces the central portion of the diaphragm packing 22 into tight sealing relation with the intermediate portion 25.

The intermediate portion 25 of the valve operating stem extends through a bearing projection 27 formed unitarily with the sleeve or housing 18.

I employ a locking means indicated generally at 28 for forcing the valve closure element 10 into tight sealing engagement with the main valve seat 8 or the auxiliary valve seat 19, and for holding the closure element in either of these positions. This means includes a pin 29 insertable through the wall of the sleeve and engageable with spaced recesses 30 and 31 in the intermediate portion 25. The pin 29 includes a tapered end portion 32 which cooperates with a tapered portion 33 of the recess 30 and a tapered portion 34 of the recess 31. The recesses 30 and 31 are spaced apart so that when the valve closure element 10 is in the position shown in Figure 1 the surface 33 may be engaged by the pin to force the packing 10b firmly against the valve seat 19, and when the valve closure element 10 is in the position shown in Figure 2 the surface 34 is positioned for engagement by the pin. In either of these positions extension of the pin 29 against the cooperating surface exerts a camming action on the valve stem to effect a tight seal between the closure element 10 and the valve seat 8 or the auxiliary valve seat 19, as the case may be.

The pin 29 is threadably received by a bushing 35 which is in turn threadably received as at 36 within a bore in the housing. 37 indicates any suitable packing between the bushing and the inner end of the bore and 37a indicates a stop pin which prevents locking pin 29 from coming unscrewed after end portion 32 disengages the recesses. By rotating the bushing 35 inwardly so as to compress the packing 37 a tight seal is effected between the sleeve and the pin 29. At any position of the bushing a set screw 38 may be tightened to hold the bushing in that position. Pin 29 may include any suitable head 39 for ease in rotating the pin and forcing it into and out of engagement with the valve stem.

I also employ a means for relieving the pressure on the diaphragm 22 when the valve is closed. The intermediate portion 25 includes a flared lower end 40 forming a second closure element or an auxiliary sealing element. This flared lower end portion 40 includes packing material 41 surrounding the lower portion of the stem 26. The packing may be formed in a recess in the portion 40. The lower side of the lower end 40 and packing material 41 are positioned so that in the closed position of the valve the packing material 41 is forced tightly against the auxiliary seat 20, thus effectively sealing off the chamber 3 from the sleeve 18 and diaphragm 22 when the valve is in the closed position. The lower portion of the stem is threadably received by the intermediate portion 25 of the stem and thus the user of the valve is able to adjust the spaced relation of the closure element 40 and the closure element 10 so as to insure a fluid-tight seal across both the seat 8 and the auxiliary seat 20 when the valve is in a closed position. Any suitable setscrew 43 may hold the lower portion 26 and intermediate portion 25 in the desired relation. The closure element 10, auxiliary sealing element 40, and the stem 11, 25, 15 forms a closure member.

Whenever it becomes necessary to change the diaphragm packing 22 the user may rotate the pin 29 inwardly to engage either the recess 30 or the recess 31, depending upon whether or not it is desired to leave the valve in the fully opened position or the fully closed position. Actuation of the locking pin 29 in either of these positions serves to compress the packing material 41 or 10b, as the case may be, and effect the sealing between the chamber 3 and the interior of the sleeve. If desired, the diaphragm 22 may be removed and replaced on an entire operating assembly, including the bonnet, hand wheel, the upper threaded stem portion and diaphragm may be replaced.

I wish to emphasize the importance of the plate-like element 17 between the main valve body and the auxiliary housing 18. This construction facilitates casting of the auxiliary housing 18 and in case it is desired to line the interior of the housng 18 with rubber or other material, it is relatively easy to do so. Furthermore, the plate-like element 17 facilitates the formation of the opposed sealing lips 19 and 20 for sealing off the chamber 3 from the diaphragm 22 when the valve-closure element is either in the open or closed position.

This application discloses subject matter common to and improvements over the subject matter disclosed in my copending applications Ser. No. 367,065, filed July 9, 1953, Ser. No. 422,085, filed April 9, 1954, and Ser. No. 422,086, filed April 9, 1954.

Whereas I have shown and described an operative form of my invention, I wish it to be understood that this showing is to be taken in an illustrative or diagrammatic sense only. There are many modifications to the invention which will be apparent to those skilled in the art and which will fall within the scope and spirit of the invention. The scope of the invention, therefore, should be limited only by the scope of the hereinafter appended claims.

I claim:
1. A diaphragm packed valve assembly including a valve body having passages therein, said passages being in communication with one another through a chamber in said body, one of said passages having a valve seat between said one passage and said chamber, a closure element adapted for movement into contact with said valve seat to thereby close said valve and operating means for moving said element toward and away from said valve seat, a diaphragm packing for sealing off said operating means from said chamber, said operating means being adapted to reciprocate a valve stem connected to said element, a first sealing element surrounding said stem and positioned between said chamber and said diaphragm, and cooperating sealing elements carried by said stem, said last named elements being selectively engageable with said first sealing element when said closure element is moved toward and away from said valve seat to thereby relieve the diaphragm from the pressure in said chamber.

2. The structure of claim 1, characterized by and including means for positively forcing one or the other of said cooperating sealing elements into engagement with said first sealing element when said closure element is in its fully open or fully closed position.

3. The structure of claim 1 characterized by and including means for adjusting one of said cooperating sealing elements relative to the other.

4. In a diaphragm packed valve, a valve body having an inlet, an outlet and a fluid flow passage therebetween, a valve seat in the fluid flow passage, a stem for forcing a closure element against said seat and operating means for reciprocating said stem, a removable sleeve positioned between said operating means and said valve seat and a diaphragm packing between said operating means and said sleeve, and means for relieving said diaphragm from the pressure in said valve including an auxiliary seating member surrounding said stem and positioned between said sleeve and said valve seat, and cooperating sealing elements carried by said stem on opposite sides of said auxiliary seating member, said cooperating sealing elements being selectively engageable with the auxiliary seating member when said closure element is moved toward and away from said valve seat to thereby seal off the diaphragm from pressure in the valve body when any of the cooperating sealing elements engage the auxiliary seating member.

5. A packing assembly for valves including a valve body having a valve seat therein, a stem for forcing a closure element against said seat and operating means for reciprocating said stem, an auxiliary removable housing surrounding said stem and packing means between said auxiliary housing and said operating means, and a removable plate-like element positioned between said auxiliary housing and the valve body, means for securing said auxiliary housing, plate-like element and valve body in fluid type relation, said plate-like element having opposed sealing lips surrounding said stem, and spaced sealing elements carried by said stem on opposite sides of said plate-like element to thereby effect a seal between the valve body and housing upon movement of said valve stem in either of two opposite directions, whereby said packing means may be removed when either sealing element carried by the stem is in engagement with said plate-like element.

6. A diaphragm packed valve assembly including a valve body having inlet and outlet passages therein, the passages being in communication with one another through a valve seat in the body, a closure element adapted for movement into contact with the valve seat to close communication between said passages, operating means for moving the closure element toward and away from the valve seat, a diaphragm packing for sealing off the operating means from the passages, an auxiliary sealing element carried by the operating means and positioned between the closure element and the diaphragm, said closure element having a portion in adjustable engagement with said auxiliary sealing element to thereby vary the lineal distance between the closure element and the auxiliary sealing element, and an auxiliary seating member between the closure element and the auxiliary sealing element and adapted for seating engagement with the auxiliary sealing element when the closure member engages the valve seat to thereby seal off the diaphragm from the pressure in the valve.

7. A diaphragm packed valve assembly including a valve body having an inlet and an outlet passage therein, the passages being in communication with one another through a valve seat in one passage, a closure element adapted for movement into contact with the valve seat to thereby prevent communication between the passages, operating means for moving the closure element toward and away from the valve seat, a diaphragm packing for sealing off the operating means from the passages, means for sealing the diaphragm from the line pressure within the valve body when the closure element is alternately in and out of sealing engagement with the valve seat including an auxiliary sealing element between the closure element and the diaphragm, a portion of the closure element being in adjustable engagement with the auxiliary sealing element whereby the distance between the closure element and the auxiliary sealing element may be varied, and a barrier member surrounding that portion of the closure element in adjustable engagement with the auxiliary sealing element, said barrier member having an auxiliary seat engageable with the auxiliary sealing element when the closure element engages the valve seat.

8. A flexible diaphragm valve assembly characterized in that the diaphragm may be removed in the open and closed position of the valve including a valve housing having an inlet and an outlet passage with a main valve seat therebetween and an aperture in the housing in communication with the passages, a separate, auxiliary seating member having upper and lower auxiliary valve seats mounted on the housing, the lower auxiliary seat being generally aligned with the housing aperture, a removable sleeve mounted on the auxiliary seating member, said sleeve having an internal projection with a passage therein, a closure member in the sleeve having a stem portion received within the passage in the internal projection, the stem further extending through the auxiliary seating member, a first sealing disc at the lower end of the closure member, said disc being disposed between the main valve seat and lower auxiliary valve seat and adapted to make sealing contact with the seats when in alternate engagement with them, a second sealing disc on the closure member having a sealing surface cooperable with the upper auxiliary valve seat, operating means for moving the sealing discs into alternate engagement with first the lower auxiliary valve seat and then simultaneously with the main valve seat and upper auxiliary valve seat, and a flexible diaphragm on the sleeve for sealing the operating means from the valve housing.

9. An adapter unit for relieving the pressure on a flexible diaphragm in a flexible diaphragm valve assembly including an auxiliary seating member having upper and lower auxiliary valve seats, said seating member being adapted to be received on a valve housing, a removable sleeve adapted to be received on the seating member at its lower end and to receive a flexible diaphragm on its upper end, a closure member in the sleeve having a first sealing disc with upper and lower sealing surfaces, a second sealing disc on the closure member having a sealing surface, operating means for moving the closure member to thereby bring the first sealing disc into sealing engagement with the lower auxiliary valve seat and alternately to bring the second sealing disc into sealing engagement with the upper auxiliary valve seat to thereby relieve the interior of the sleeve from the pressure in the valve while either of the sleeve discs in engagement with the auxiliary sealing member, and locking means for maintaining the sealing discs in alternate sealing engagement with the auxiliary valve seats including a locking member extending through the sleeve and positively engageable with the closure member at positions corresponding to the seating positions of the sealing discs.

10. The adapter unit of claim 9 further characterized in that the locking member is a pin having a threaded portion in threaded engagement with the sleeve, the crest diameter of the pin threads being greater than the diameter of the pin or either side of the threads, and the locking means further comprises travel limiting and position indicating means for the pin including a stop pin extending through the sleeve exteriorly of the threaded portion of the pin, the stop pin being engageable with the locking pin, said stop pin being axially outwardly spaced far enough along the locking pin to permit disengagement of the pin with the stem before impingement of the pin threads on the stop pin.

11. An adapter assembly for relieving the pressure on a flexible diaphragm in a flexible diaphragm valve assembly to thereby permit removal of the diaphragm during use including a sleeve having a lower end adapted for connection to a valve housing and the upper end to a flexible diaphragm, an auxiliary valve seat at the lower end of the sleeve, an internal projection in the sleeve having a bore therethrough for the reception of the stem of a valve closure element, said projection occupying less than the entire cross-sectional internal area of the sleeve to thereby permit free communication of fluid between the upper and lower ends of the sleeve, a valve closure element, a stem for the valve closure element slidably received within the bore in the internal projection, said stem being loosely received within the auxiliary valve seat at all angular positions of the stem with respect to the auxiliary valve seat, said closure element being located between the auxiliary valve seat and the valve housing at the lower end of the stem, said closure element having upper and lower surfaces extending outwardly from the stem, both the upper and lower surfaces having recesses filled with packing material, said stem being adapted at its upper end for attachment to the flexible diaphragm and to operating means for moving the closure element into and out of engagement with the auxiliary seat, locking means for maintaining the closure element in sealing engagement with the auxiliary valve seat including a locking pin extending through the sleeve and internal projection and terminating in a surface cooperable with a complemenatry surface on the stem to thereby force the upper surface of the closure element into snug engagement with the auxiliary valve seat, and second operating means for moving the locking pin in to and out of engagement with the stem.

References Cited in the file of this patent
UNITED STATES PATENTS

| | | |
|---|---|---|
| 774,985 | Jones | Nov. 15, 1904 |
| 787,627 | Lippold | Apr. 18, 1905 |
| 1,119,948 | Green | Dec. 8, 1914 |
| 1,157,956 | Osborne | Oct. 26, 1915 |
| 1,185,789 | Garbe | June 6, 1916 |
| 1,302,567 | LaBour | May 6, 1919 |
| 1,860,468 | MacLean | May 31, 1932 |
| 1,970,964 | Hosmer | Aug. 21, 1934 |
| 2,049,516 | Ruhstorfer | Aug. 4, 1936 |
| 2,223,702 | Penick | Dec. 3, 1940 |
| 2,598,224 | Clonts | May 27, 1952 |
| 2,642,255 | Lindgren | June 16, 1953 |
| 2,682,386 | Lindsay | June 29, 1954 |
| 2,766,829 | Watts | Oct. 16, 1956 |